Sept. 4, 1951     G. E. TRIMMER     2,566,435
DUAL TIRE GAUGE
Filed Jan. 17, 1947     3 Sheets-Sheet 1
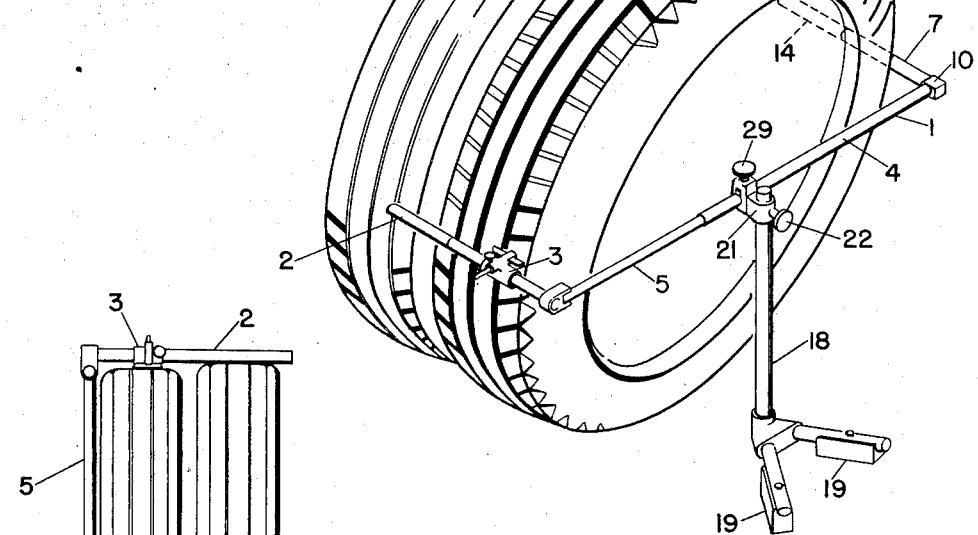
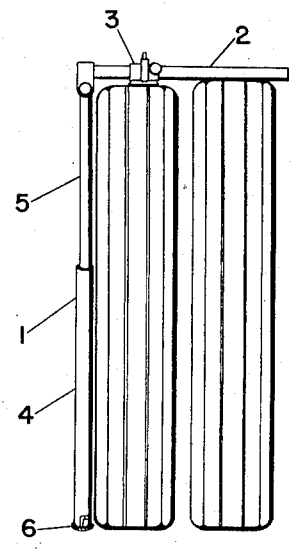
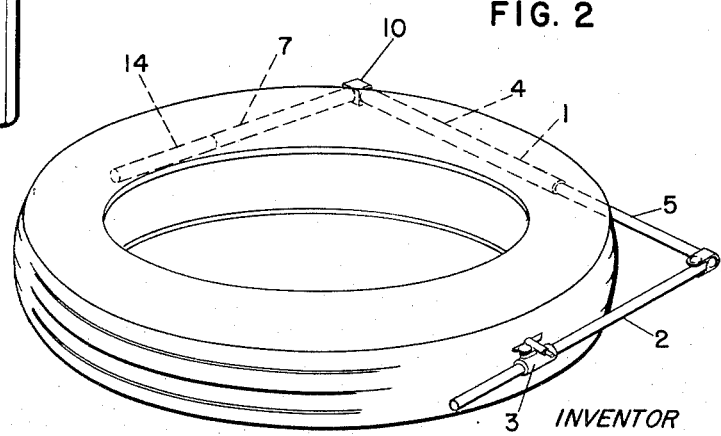
INVENTOR
GEORGE E. TRIMMER
BY
A. Schapp
Attorney Sept. 4, 1951　　　　G. E. TRIMMER　　　　2,566,435
DUAL TIRE GAUGE
Filed Jan. 17, 1947　　　　　　　　　　3 Sheets-Sheet 2
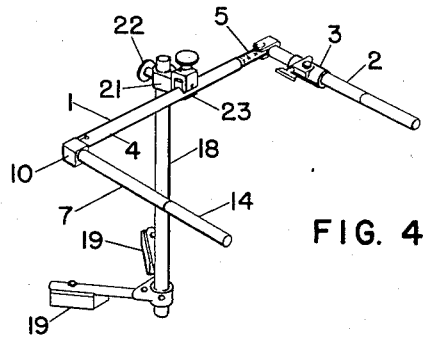
FIG. 4
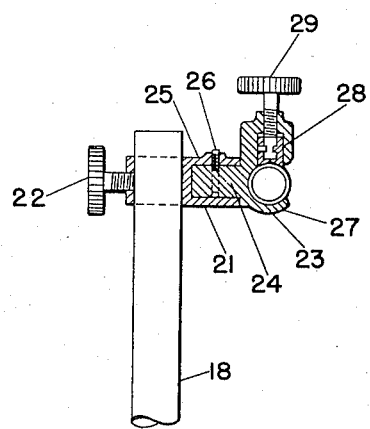
FIG. 6
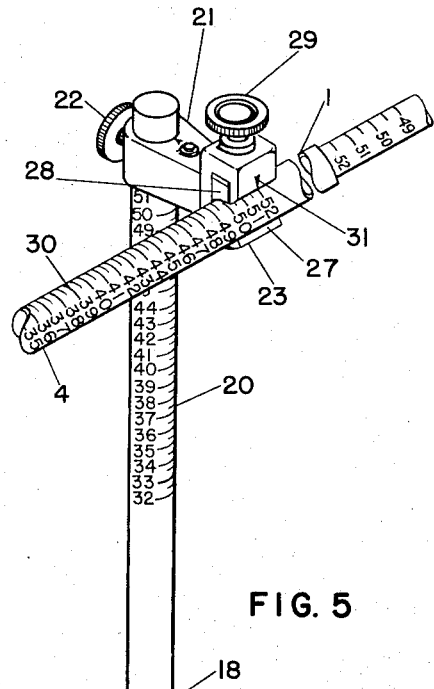
FIG. 5
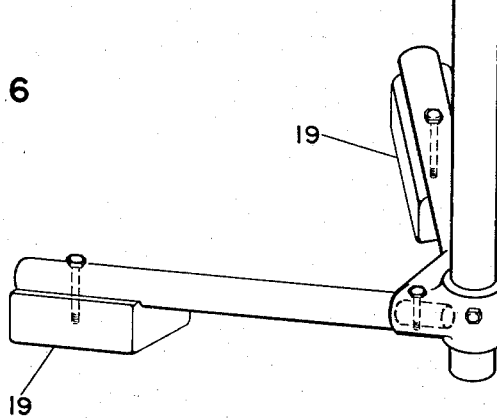
INVENTOR
GEORGE E. TRIMMER
BY
A. Schapp
Attorney Sept. 4, 1951 G. E. TRIMMER 2,566,435
DUAL TIRE GAUGE
Filed Jan. 17, 1947 3 Sheets-Sheet 3
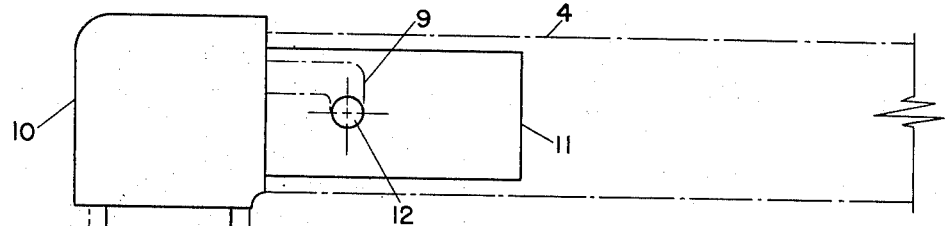
FIG. 7
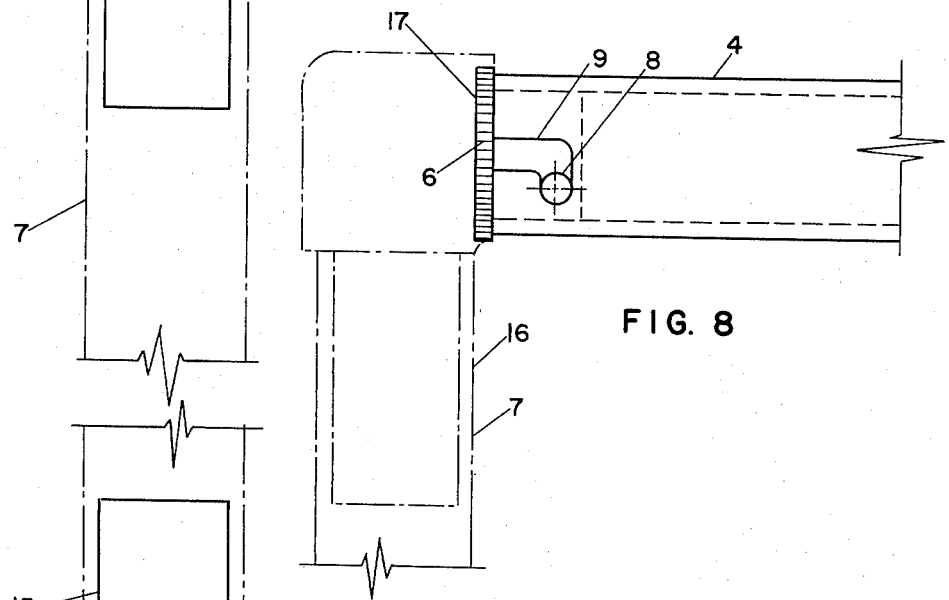
FIG. 8
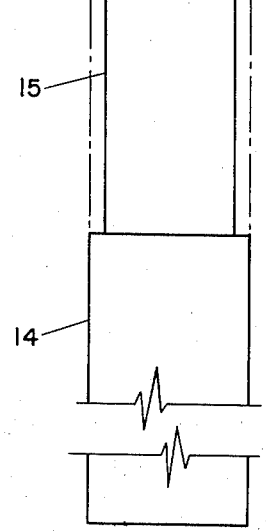
INVENTOR.
GEORGE E. TRIMMER
BY Patented Sept. 4, 1951

2,566,435

UNITED STATES PATENT OFFICE 2,566,435

DUAL TIRE GAUGE

George E. Trimmer, San Francisco, Calif.

Application January 17, 1947, Serial No. 722,673

2 Claims. (Cl. 33—143)

The present invention relates to improvements in tire tools and its principal object is to provide a tool adapted for establishing differences in height in dual tires, such as are commonly used on trucks and heavy motor vehicles.

Tools of this character were described by me in my previous applications, Serial No. 599,880 filed June 16, 1945, now abandoned, and Serial No. 691,094 filed August 16, 1946.

In the present invention it is proposed to make certain additions to the tire tool previously described, which renders the latter adaptable for various additional uses.

More particularly it is proposed to adapt the tire tool for use in connection with tires regardless of the position of the tire, whether lying down on the floor or leaning against a wall or actually mounted on a motor vehicle.

It is further proposed to arrange the tool so that it may be readily used for gauging the surface of a single tire at various points to ascertain whether the surface is even and the diameter is the same throughout.

It is a further object of the invention to make further additions to the tool whereby the latter may be more readily positioned and centered with respect to the tire.

It is further contemplated to provide calibrating means arranged in such a manner that when the readings on the various calibrating means agree the tool is properly centered with respect to the tire.

And, finally, it is proposed to arrange the tire tool in such a manner that it may be readily changed for different uses without interfering with the correct reading of the calibrating means.

Further objects and advantages of my invention will appear as the specification proceeds and the novel features of my invention will be fully defined in the claims attached hereto.

The preferred forms of my invention are illustrated in the accompanying drawings, in which Figure 1 illustrates my tire tool in its simplest form as applied to the gauging of dual tires, this tool being substantially similar to that described in my co-pending application, Ser. No. 691,094, except for a slight modification necessitated by the adaptation of the tool for different purposes;

Figure 2 shows the same tool with certain additions to adapt the same for the gauging of a tire lying on the ground surface at any number of different points;

Figure 3 shows, in perspective view, a further development of the tire tool of Figure 2, the principal idea of this tool being to adapt the same for centering with respect to a pair of tires;

Figure 4 a perspective view similar to that of Figure 3 but taken from a different angle;

Figure 5 an enlarged perspective detail view of portions of the tool illustrated in Figure 4;

Figure 6 a detail section through a bracket used in my tire tool;

Figure 7 an enlarged detail view illustrating a corner section of my tool; and

Figure 8 a detail view of the same corner section modified as applied to a different use.

While I have shown only the preferred forms of my invention, I wish to have it understood that various changes and modifications may be made within the scope of the claims attached hereto without departing from the spirit of the invention.

Referring first to the tire tool shown in Figure 1, the same substantially corresponds to that illustrated in my co-pending application and comprises an extensible spacing member 1 adapted to be placed against the side of a tire and having a gauging member 2 projecting at a right angle from the upper end so as to contact the upper face of the larger one of a dual set of tires. The gauging member has a suitable gauge 3, such as described in the co-pending application, slidable thereon and this gauge is used to establish the difference in height between the two tires. The spacing member consists of two sections 4 and 5, the former being in the form of a pipe and the latter in the form of a rod slidable in the pipe. The lower end of the pipe 4 is closed by a cap 6 which serves as a rest for the tool. The rod 5 is provided with calibrations (not shown) which are readable against the upper edge of the pipe to indicate the height of the lower face of the gauge member 2 above the floor on which the tires rest.

In order to make this tool available for gauging a tire from opposite sides, I modify the same as shown in Figure 2 by adding a second gauge member 7 at the lower end of the spacing member 1. In doing this care had to be taken to add the second member in such a way that the reading of the calibrations remains correct for the inner faces of the two gauge members 2 and 7. This problem I solve in the manner indicated in the comparative views of Figures 7 and 8. The latter figure shows the cap 6 applied to the pipe 4 of the spacing member by means of a pin 8 and a bayonet slot 9 for use of the device as shown in Figure 1. In the view of Figure 7 the cap has been removed and a corner piece 10 has been substituted, the corner piece having one stem 11 projecting into the pipe 4 and secured therein by means of a pin 12 and the same bayonet slot 9. A second stem 13 projects from the corner piece at a right angle and is adapted to receive the member 7 thereon, the latter member being in the form of a pipe adapted to receive an extension member 14 engaging in the pipe through a stem 15.

In Figure 8 a phantom view of the gauge member 7 is superimposed on the cap for the purpose of illustrating that the inner face 16 of the gauge member 7 occupies the same plane as the outer face 17 of the cap 6 so that the calibration readings are correct for the gauge member as well as for the cap.

The device illustrated in Figure 2 is placed on the tire so as to cause the two gauge members 2 and 7 to straddle the same and it will be readily seen that the tool may be easily moved around the tire to test every point of its surface.

A further development of the tool is shown in Figure 3, in which a standard 18 is used for suporting the tool of Figure 2 midway of one or more tires to be tested. The standard, more fully illustrated in Figure 5, is supported by suitable feet 19 and is calibrated as shown at 20 to indicate the full height or outer diameter of the tire when the selected calibration point is opposite the center of the tire. The standard has a bracket 21 slidable thereon, the bracket being held in adjusted position by means of a screw 22. The bracket includes a holding member 23 for the spacing member 1, the holding member having a stem 24 revolvable in a socket 25 in the bracket, the stem being held against endwise movement by a screw 26, engaging in an annular groove in the stem. The holding member has a lower flange 27 drawn to the curvature of the pipe section 4 so as to allow the latter to rest thereon and to be locked in place by a sliding block 28 operable by a screw 29. When the sliding block is retracted the side opening of the holding member is sufficiently wide to allow the pipe section to be lifted out sidewise.

The section 4 of the spacing member 1 is calibrated, as shown at 30, to read against an indicator 31 on the holding member, and the figures are arranged in such a manner as to indicate the ful diameter of the tire in any selected position. Section 5 of the spacing member 1 is also calibrated to read against the end of section 4, these calibrations being arranged so that if the reading is made to correspond to the respective readings on the standard and on the section 4 the two arms of the spacing member on opposite sides of the bracket will be exactly alike.

To adjust the device for use the operator may first adjust the gauging tool, as shown in Figure 1, over the tire to be tested, then insert section 4 of the spacing member 1 in the bracket and adjust the same, as well as the bracket on the standard, to the same reading as ascertained from section 5. This will cause the standard and the gauging device to be exactly centered with respect to the tire, as illustrated in Figure 3. The gauging tool may now be revolved about the tire to test the same for any unevenness in surface.

I claim:

1. In a tire tool of the character described, a standard having a base supporting the same, a bracket slidable on the standard and projecting sidewise therefrom, a swivel member mounted upon the end of said bracket with freedom of rotation on an axis perpendicular to the standard, an extensible spacing member slidably mounted in the swivel member for movement in a plane perpendicular to said axis and having arms presented on opposite sides of the bracket, and gauge members projecting from the free ends of the spacing member for gauging a tire interposed therebetween, the standard having calibrations readable against the bracket, one extensible portion of the spacing member having calibrations readable against the swivel member, and the other extensible portion of the spacing member having calibrations readable against said one extensible portion to indicate the distance between the gauge members.

2. In a tire tool of the character described, a standard having a base supporting the same, a bracket slidable on the standard and projecting sidewise therefrom, a swivel member mounted upon the end of said bracket with freedom of rotation on an axis perpendicular to the standard, an extensible spacing member slidably mounted in the swivel member for movement in a plane perpendicular to said axis and having arms presented on opposite sides of the bracket, and gauge members projecting from the free ends of the spacing member for gauging a tire interposed therebetween, the standard having calibrations readable against the bracket, one extensible portion of the spacing member having calibrations readable against the swivel member, and the other extensible portion of the spacing member having calibrations readable against said one extensible portion to indicate the distance between the gauge members, and the three calibrations being made to register when the spacing member is centered with respect to the axis of rotation and the latter axis is spaced from the bottom of the base by one-half the distance between the gauge members.

GEORGE E. TRIMMER.

REFERENCES CITED

The following references are of record in the file of this patent:

UNITED STATES PATENTS

| Number | Name | Date |
|---|---|---|
| 467,732 | Carr | Jan. 26, 1892 |
| 695,661 | Thiebault | Mar. 18, 1902 |
| 1,138,736 | Dedreux | May 11, 1915 |
| 1,245,213 | Gammeter | Nov. 6, 1917 |
| 1,761,163 | Weaver | June 3, 1930 |
| 1,840,766 | Creagmile | Jan. 12, 1932 |
| 2,000,866 | Smith | May 7, 1935 |
| 2,029,067 | Graham et al. | Jan. 20, 1936 |
| 2,061,326 | Morse et al. | Nov. 17, 1936 |
| 2,090,294 | Haucke | Aug. 17, 1937 |
| 2,124,006 | Parker | July 19, 1938 |
| 2,282,114 | Brister | May 5, 1942 |
| 2,435,644 | Beckett et al. | Feb. 10, 1948 |

FOREIGN PATENTS

| Number | Country | Date |
|---|---|---|
| 529,473 | Great Britain | Nov. 21, 1940 |